US010442550B2

(12) United States Patent
Salnikov

(10) Patent No.: US 10,442,550 B2
(45) Date of Patent: Oct. 15, 2019

(54) SURFACING FILM FOR COMPOSITE STRUCTURES

(71) Applicant: 3M INNOVATIVE PROPERTIES COMPANY, St. Paul, MN (US)

(72) Inventor: Dmitriy Salnikov, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 261 days.

(21) Appl. No.: 15/482,898

(22) Filed: Apr. 10, 2017

(65) Prior Publication Data
US 2017/0210485 A1    Jul. 27, 2017

Related U.S. Application Data

(63) Continuation of application No. 12/625,002, filed on Nov. 24, 2009, now abandoned.

(60) Provisional application No. 61/118,242, filed on Nov. 26, 2008.

(51) Int. Cl.
| B64D 45/02 | (2006.01) |
| B32B 7/02 | (2019.01) |
| B32B 15/08 | (2006.01) |
| B32B 15/20 | (2006.01) |
| B32B 27/18 | (2006.01) |
| B32B 27/28 | (2006.01) |
| B32B 27/32 | (2006.01) |
| B32B 27/34 | (2006.01) |
| B32B 27/36 | (2006.01) |
| B32B 27/38 | (2006.01) |
| B32B 27/42 | (2006.01) |

(52) U.S. Cl.
CPC .............. *B64D 45/02* (2013.01); *B32B 7/02* (2013.01); *B32B 15/08* (2013.01); *B32B 15/20* (2013.01); *B32B 27/18* (2013.01); *B32B 27/281* (2013.01); *B32B 27/285* (2013.01); *B32B 27/32* (2013.01); *B32B 27/34* (2013.01); *B32B 27/36* (2013.01); *B32B 27/38* (2013.01); *B32B 27/42* (2013.01); *B32B 2262/101* (2013.01); *B32B 2262/106* (2013.01); *B32B 2264/02* (2013.01); *B32B 2264/067* (2013.01); *B32B 2264/105* (2013.01); *B32B 2264/108* (2013.01); *B32B 2264/12* (2013.01); *B32B 2270/00* (2013.01); *B32B 2307/202* (2013.01); *B32B 2307/714* (2013.01); *Y10T 156/10* (2015.01); *Y10T 428/31511* (2015.04); *Y10T 428/31678* (2015.04)

(58) Field of Classification Search
None
See application file for complete search history.

(56) References Cited

U.S. PATENT DOCUMENTS

| 3,975,322 | A | 8/1976 | Reinshagen |
| 5,225,265 | A | 7/1993 | Prandy |
| 5,470,413 | A | 11/1995 | Cedarleaf |
| 7,596,986 | B2 | 10/2009 | Daniels |
| 2002/0182339 | A1 | 12/2002 | Taylor |
| 2004/0185733 | A1 | 9/2004 | Murai |
| 2005/0064200 | A1 | 3/2005 | Takahashi |
| 2006/0139893 | A1* | 6/2006 | Yoshimura .......... H01L 25/0657 361/735 |
| 2006/0165942 | A1 | 7/2006 | Miyata |
| 2006/0182949 | A1 | 8/2006 | Salnikov |
| 2007/0027280 | A1* | 2/2007 | Hahnfeld ................ C08F 38/00 526/285 |
| 2007/0129509 | A1 | 6/2007 | Li |
| 2007/0141927 | A1 | 6/2007 | Brown |
| 2007/0155900 | A1* | 7/2007 | Chang ................. A61F 13/4902 525/88 |
| 2007/0167578 | A1* | 7/2007 | Arriola .................... B32B 27/32 525/242 |
| 2008/0015305 | A1 | 1/2008 | Berger |
| 2008/0099121 | A1 | 5/2008 | Oka |
| 2008/0277057 | A1* | 11/2008 | Montgomery .......... B29C 70/08 156/307.1 |
| 2009/0189300 | A1* | 7/2009 | Kawakami .......... C08G 59/621 257/787 |
| 2011/0045284 | A1 | 2/2011 | Matsukawa |

FOREIGN PATENT DOCUMENTS

| EP | 0 522 663 A1 | 1/1993 |
| WO | WO 1994/014601 | 7/1994 |
| WO | WO 2006/088704 | 8/2006 |
| WO | WO 2007/127032 | 11/2007 |

OTHER PUBLICATIONS

International Search Report, PCT/US2009/065698, 3 pages.
Zarnitz, Charles; "Epalloy 7200 for use as an Accelerator in Elevated Temperature Cure Epoxy Systems". Retrieved on Mar. 2012 http://www.emeraldmaterials.com/epm/cvc/micms_doc_admin.display?p_customer=FISCVC&p_name=7200%20FOR%20ELEVATED%20CURE%ACCELERATION%20TSRO82405.PDF.
Watkins, Michael J., "Tech Note: Comparison of Aliphatic and Aromatic Epoxy Modifiers", (Feb. 2011) Retrieved on Mar. 15, 2012. http://www.cypresschemicalconsulting.com/Assets/Documents/Comparison_of_Aliphatic_and_Aromatic_Epoxy_Modifiers.pdf.

* cited by examiner

Primary Examiner — Megan McCulley
(74) Attorney, Agent, or Firm — Philip P. Soo

(57) ABSTRACT

A layered construction is provided having a storage modulus $G'_{t25}$ at 25° C., comprising: a) a cured polymeric composite having a storage modulus $G'_{s25}$ at 25° C.; and b) a cured surfacing film bound thereto; wherein $G'_{t25}$ is not greatly elevated over $G'_{s25}$, typically not more than 118% of $G'_{s25}$. In some embodiments the cured surfacing film comprises an electrically conductive layer, typically a metal layer. In some embodiments the cured surfacing film comprises a cured epoxy resin which may optionally be a chain-extended epoxy resin and may excludes phosphorus. The resulting layered construction may display high erosion resistance, high corrosion resistance, and high resistance to microcracking. In another aspect, methods of making the subject layered constructions are provided.

19 Claims, 4 Drawing Sheets

SURFACING FILM FOR COMPOSITE STRUCTURES

CROSS REFERENCE TO RELATED APPLICATION

This application is a continuation application of U.S. patent application Ser. No. 12/625,002, filed on Nov. 24, 2009, which claims the benefit of U.S. Provisional patent Application No. 61/118,242, filed on Nov. 26, 2008, the disclosures of which are incorporated by reference herein in their entirety.

FIELD OF THE DISCLOSURE

This invention relates to surfacing films for polymeric fiber-reinforced composites, optionally including electrically conductive layers, which display high erosion resistance, high corrosion resistance, and high resistance to microcracking, the films being selected such that the storage modulus of the composite bearing the surfacing film is not greatly elevated compared to the storage modulus of the bare composite.

SUMMARY OF THE INVENTION

Briefly, the present disclosure provides a layered construction having a storage modulus $G'_{t25}$ at 25° C., comprising: a) a cured polymeric composite having a storage modulus $G'_{s25}$ at 25° C.; and b) a cured surfacing film bound thereto; wherein $G'_{t25}$ is no more than 118% of $G'_{s25}$, more typically no more than 115%, more typically no more than 112%, in some embodiments no more than 110%, in some embodiments no more than 108%, in some embodiments no more than 106%, and in some embodiments no more than 104%. In some of the foregoing embodiments, $G'_{t25}$ is at least 101% of $G'_{s25}$. In other embodiments, the present disclosure provides a layered construction having a storage modulus $G'_{t-54}$ at −54° C., comprising: a) a cured polymeric composite having a storage modulus $G'_{s-54}$ at −54° C.; and b) a cured surfacing film bound thereto; wherein $G'_{t-54}$ is no more than 122% of $G'_{s-54}$, more typically no more than 118%, more typically no more than 115%, more typically no more than 111%, in some embodiments no more than 110%, in some embodiments no more than 107%, and in some embodiments no more than 104%. In some of the foregoing embodiments, $G'_{t-54}$ is at least 101% of $G'_{s-54}$. In some embodiments the cured surfacing film comprises an electrically conductive layer, typically a metal layer, which may optionally be a foil, expanded foil, mesh, cloth, wires, or the like. In some embodiments the cured surfacing film comprises a cured epoxy resin which may optionally be a chain-extended epoxy resin. Typically the resin excludes phosphorus. In some embodiments the layered construction displays high erosion resistance. In some embodiments the layered construction displays high corrosion resistance. In some embodiments the layered construction displays high resistance to microcracking. In some embodiments the layered construction displays high resistance to microcracking in response to thermal shock. In some embodiments the layered construction displays high resistance to microcracking in response to mechanical stress.

In another aspect, the present disclosure provides a method of making a layered construction comprising the steps of: a) providing a curable polymeric composite; b) providing a curable surfacing film; c) providing a tool having a shape which is the inverse of the desired shape of the layered construction; d) laying up the curable surfacing film and the curable polymeric composite, in that order, in the tool; and e) curing the curable polymeric composite and curable surfacing film. In some embodiments, the resulting layered construction has a storage modulus $G'_{t25}$ at 25° C., wherein a construction made in the same manner but lacking the curable surfacing film has a storage modulus $G'_{s25}$ at 25° C.; and wherein $G'_{t25}$ is no more than 118% of $G'_{s25}$, more typically no more than 115%, more typically no more than 112%, in some embodiments no more than 110%, in some embodiments no more than 108%, in some embodiments no more than 106%, and in some embodiments no more than 104%. In some of the foregoing embodiments, $G'_{t25}$ is at least 101% of $G'_{s25}$. In other embodiments, the resulting layered construction has storage modulus $G'_{t-54}$ at −54° C., wherein a construction made in the same manner but lacking the curable surfacing film has a storage modulus $G'_{s-54}$ at −54° C.; wherein $G'_{t-54}$ is no more than 122% of $G'_{s-54}$, more typically no more than 118%, more typically no more than 115%, more typically no more than 111%, in some embodiments no more than 110%, in some embodiments no more than 107%, and in some embodiments no more than 104%. In some of the foregoing embodiments, $G'_{t-54}$ is at least 101% of $G'_{s-54}$. In some embodiments, curing is carried out under sub-atmospheric pressure, typically less than 90% of one atmosphere, more typically less than 50% of one atmosphere, and more typically less than 10% of one atmosphere. In some embodiments the curable surfacing film comprises an electrically conductive layer, typically a metal layer, which may optionally be a foil, expanded foil, mesh, cloth, wires, or the like. In some embodiments the curable surfacing film comprises a curable epoxy resin which may optionally be a chain-extended epoxy resin. Typically the resin excludes phosphorus. In some embodiments the resulting layered construction displays high erosion resistance. In some embodiments the resulting layered construction displays high corrosion resistance. In some embodiments the resulting layered construction displays high resistance to microcracking. In some embodiments the resulting layered construction displays high resistance to microcracking in response to thermal shock. In some embodiments the resulting layered construction displays high resistance to microcracking in response to mechanical stress.

DETAILED DESCRIPTION

Figure 1:
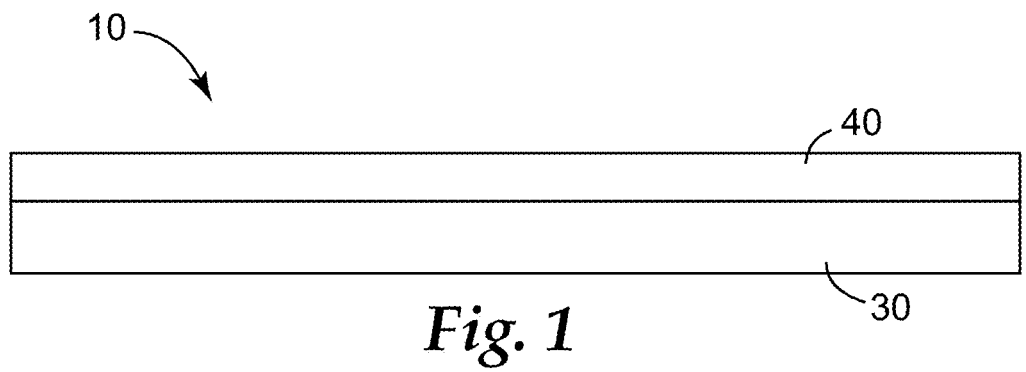
FIG. 1 is diagram of a layered construction as described in the Examples section, below.

The present disclosure relates in general to a surfacing material to surface composite structures and methods of using same.

The use of fiber reinforced resin matrix composite laminates has become widely accepted for the variety of applications in aerospace and automotive industries because their light weight, high strength and stiffness. Weight reduction benefits and performance enhancements are the biggest drivers behind implementation of fiber reinforced resin matrix composite laminates into industrial applications. Various airspace components being manufactured from fiberglass and carbon fibers reinforced composites including airplane fuselage sections and wing structures. But being light and strong, composite structures are not nearly as electrically conductive as previously widely utilized aluminum structures. There is a need to provide adequate lightning strike protection for composite structures. Composite structures and in particular composite aircrafts what are not constantly grounded must rely on a lightning protection system capable of rapidly dissipate charge throughout the bulk of its structure as a means of electrical energy dissipation. To prevent corrosion and subsequent loss of conductivity, a metallic lightning strike component may be encapsulated into surfacing film. The lightning strike protection system has to be sufficiently conductive, lightweight and durable. The durability of the lightning strike protection system depends in great part on the reliability of the surfacing polymer encapsulating the metallic component. Lightning protection systems tend to experience bulk microcracking and surface cracking due to the continuous changes in temperature, humidity and pressure, differences in coefficients of thermal expansion of different components, locked-in internal stresses, less then ideal interfacial adhesion between metallic component and surfacing polymer as well as continuous cyclical stresses on various aircraft components. Microcracking and surface cracking may make metallic component of a lightning protection system susceptible to corrosion and subsequent loss of electrical conductivity by allowing moisture penetration. Corrosion deterioration of lightning strike protection can lead to increased inspection time, increased maintenance time and cost and potential compromise of aircraft safety. Microcracking and surface cracking can extend into the surface finish producing visual defects on the painted surfaces and further increase maintenance costs.

This disclosure demonstrates that the ability of the cured composite articles with surfacing film according to the present disclosure to resist microcracking is related to elastic (storage) modulus (G') of the surfacing film. Elastic (storage) modulus (G') may be tested by conventional methods, typically Rheometric Dynamic Analyzer, torsion mode, as described in the Examples. Improved microcracking resistance was found for the surfacing films according to the present disclosure where the films are selected such that the storage modulus of the composite bearing the surfacing film is not greatly elevated compared to the storage modulus of the bare composite. This selection may also be stated as follows: the storage modulus for the composite with surfacing film measured at 25° C. [$G'_{t25}$] is no more than 118% of the storage modulus for the composite without surfacing film measured at 25° C. [$G'_{s25}$], more typically no more than 115%, more typically no more than 112%, in some embodiments no more than 110%, in some embodiments no more than 108%, in some embodiments no more than 106%, and in some embodiments no more than 104%. This selection may also be stated as follows: the storage modulus for the composite with surfacing film measured at −54° C. [$G'_{t-54}$] is no more than 118% of the storage modulus for the composite without surfacing film measured at −54° C. [$G'_{s-54}$], more typically no more than 115%, more typically no more than 112%, in some embodiments no more than 110%, in some embodiments no more than 108%, in some embodiments no more than 106%, and in some embodiments no more than 104%.

Any suitable polymeric composite may be used. Composites useful in the present disclosure may comprise any suitable reinforcement components, which may include metal, wood, polymer, carbon particles or fibers, glass particles or fibers, or combinations thereof, and may include any suitable matrix component, which may include as polyester, vinyl ester, epoxy, phenolic, polyimide, polyamide, polypropylene, PEEK, or other such polymers or combinations thereof, and may optionally be made using pre-preg materials.

Any suitable surfacing film may be used which meets the storage modulus requirements recited herein. In some embodiments the curable surfacing film comprises curable epoxy resin. In some embodiments the curable surfacing film comprises a curable epoxy resin which may optionally be a chain-extended epoxy resin. In some embodiments the curable surfacing film comprises a core shell rubber toughening agent. In some embodiments the curable surfacing film comprises a urethane modified epoxy resin. In some embodiments the curable surfacing film comprises a CTBN modified epoxy resin. In some embodiments the curable surfacing film comprises a phenoxy resin. In some embodiments the curable surfacing film comprises micronized phenoxy resin. In some embodiments the curable surfacing film comprises a phenolic hardener. Typically the resin excludes phosphorus.

The composition of the curable surfacing film is typically different from the composition of the curable matrix polymer of the polymeric composite. The composition of the cured surfacing film is typically different from the composition of the cured matrix polymer of the polymeric composite.

In some embodiments the curable surfacing film comprises an electrically conductive layer, typically a metal layer, which may optionally be a foil, expanded foil, mesh, cloth, wires, or the like.

The curable surfacing film may have any suitable thickness, typically between 0.05 and 1.0 mm.

The layered construction may be made by any suitable method. In some embodiments, a curable surfacing film and a curable polymeric composite are laid up, in that order, in a tool having a shape which is the inverse of the desired shape of the layered construction the curable polymeric composite and curable surfacing film are cured. In some embodiments, curing is accomplished with application of heat. In some embodiments, curing is carried out under sub-atmospheric pressure, typically less than 90% of one atmosphere, more typically less than 50% of one atmosphere, and more typically less than 10% of one atmosphere.

Objects and advantages of this invention are further illustrated by the following examples, but the particular materials and amounts thereof recited in these examples, as well as other conditions and details, should not be construed to unduly limit this invention.

Examples Ex. 1-5 and Comparative Examples Cex. 1-5

Unless otherwise noted, all reagents were obtained or are available from Aldrich Chemical Co., Milwaukee, Wis., or may be synthesized by known methods.

Materials Used:
EPON™ 1004F: a medium molecular weight bisphenol A-based polyepoxide resin having an epoxide equivalent weight of from 800 to 950 grams/equivalent, by Hexion Specialty Chemicals GmbH, available from Resolution Performance Products, Houston, Tex.
D.E.H.™ 85: Unmodified phenolic hardener having an active hydrogen equivalent weight of from 250 to 280 grams/equivalent, available from Dow Chemical Company, Midland, Mich.
PAPHEN® PKHP-200: micronized phenoxy resin, having a particle size of <200 microns, available from Phenoxy Associates, Rock Hill, S.C. USA.
HYPDX™ UA10: HyPox™ UA10 Urethane Modified Bisphenol A Epoxy Resin, available from CVC Specialty Chemicals Inc., Moorestown, N.J., USA.
HYPDX™ RA95: HyPox™ RA95 CTBN Modified Bisphenol A Epoxy Resin, available from CVC Specialty Chemicals Inc., Moorestown, N.J., USA.
KANE ACE® MX 120: a 25% concentrate of core shell rubber toughening agent in unmodified liquid epoxy resin based on Bisphenol-A, available from Kaneka Texas Corporation, 6161 Underwood Road, Pasadena Tex. 77507.
EPALLOY® 7200: A chemically modified bisphenol A diglycidyl ether undiluted resin available from CVC Specialty Chemicals Inc., Moorestown, N.J., USA.
AMICURE® CG-1400: Dicyandiamide curing agent available from Air Products and Chemicals, Incorporated, Allentown, Pa.
OMICURE™ U-52: Aromatic substituted urea (4,4' methylene bis (phenyl dimethyl urea)) used as a latent accelerator for the dicyandiamide cure of epoxy resins, available from CVC Specialty Chemicals Inc., Moorestown, N.J., USA.
AF-555: 3M™ Scotch-Weld™ Structural Adhesive Film AF-555 U 0.015, an unsupported, thermosetting epoxy structural adhesive designed for curing at temperatures of 300° F. (149° C.) to 350° F. (177° C.), available from 3M Company, St. Paul, Minn.
AF-191: 3M™ Scotch-Weld™ Structural Adhesive Film AF-191 U 0.05, an unsupported, thermosetting, modified epoxy designed for bonding composites, metal to metal and metal to honeycomb components where high strength and peel at 350° F. (177° C.), available from 3M Company, St. Paul, Minn.
AF-325: 3M™ Scotch-Weld™ Low Density Composite Surfacing Film AF-325, Blue, 0.035, available from 3M Company, St. Paul, Minn.
FM® 300-2K: FM® 300-2K 0.08 red modified epoxy adhesive film comprising a knit carrier for support available from Cytec Engineered Materials Technical Service Havre de Grace, MD 21078.
SYNSKIN® HC 9837.1: Epoxy-based composite surfacing film designed to improve the surface quality of honeycomb stiffened composite parts, comprising a non-woven fabric for support. Available from Henkel Corporation, Aerospace Group, 2850 Willow Pass Road, Bay Point, Calif. 94565
Liner: Siliconized kraft paper available from Loparex, IowaCity, Iowa, USA, as product #23210 (76# BL KFT H/HP 4D/6MH paper 42").
Expanded Copper Foil: DEXMET® 3CU7-100A, 0.040 lb/ft$^2$ (195.3 g/m$^2$). Available from Dexmet Corporation, 14 Commercial Street, P.O. Box 427, Branford, Conn. 06405.
Pre-Preg: A woven carbon fiber/epoxy resin composite pre-preg material available from Critical Materials, Incorporated, Poulsbo, Wash., as BMS 8-256, TYPE 4, CLASS 2, STYLE 3K-70-PW, CYCOM® 970/PWC T300 3K VT 42".

TABLE 1

Formulations.

| Component | Ex. 1 | Ex. 2 | Ex. 3 | Ex. 4 | Ex. 5 | CEx-1 | CEx-2 | CEx-3 | CEx-4 | CEx-5 |
|---|---|---|---|---|---|---|---|---|---|---|
| EPON™ 1004F | 15 | 15 | 15 | 15 | 10 | AF-325 | AF-555 | AF-191 | SYNSKIN® HC 9837.1 | FM® 300-2K |
| KANE ACE® MX 120 | 15 | 10 | 10 | 10 | 15 | | | | | |
| EPALLOY® 7200 | 20 | 30 | 20 | 20 | 30 | | | | | |
| HYPOX™ UA10 | 0 | 0 | 5 | 0 | 0 | | | | | |
| HYPOX™ RA95 | 0 | 0 | 0 | 5 | 0 | | | | | |
| PAPHEN® PKHP-200 | 5 | 5 | 5 | 5 | 5 | | | | | |
| D.E.H.™ 85 | 0 | 0 | 0 | 0 | 2.5 | | | | | |
| AMICURE® CG-1400 | 2.8 | 3.2 | 2.8 | 2.8 | 3.5 | | | | | |
| OMICURE™ U-52 | 1.5 | 1.5 | 1.5 | 1.5 | 1.5 | | | | | |

Preparation of Resin Compositions

For Examples 1-5, the polyepoxide resins and flow modifier (if applicable) indicated in Table 1 were charged into a 200 gram capacity plastic container in the indicated ratios. The container was heated for about 15 minutes in a forced air oven set at 125° C., after which it was removed and placed in a planetary-type mixer (SPEED MIXER™, Model DA 400 FV, available from Synergy Devices Limited, Buckinghamshire, United Kingdom) set at a speed of 2750 rpm for 1 minute. The container with the blend of polyepoxide resins and flow modifier (if applicable) was then returned to the oven and equilibrated at about 120° C. for between 15 and 20 minutes. Next, a toughening modifier was added to the resin/modifier blend and it was mixed as described above, after which the container was removed from the planetary mixer and allowed to cool below 100° C. The curing agents were then added and the blend was mixed as described above. After removal from the mixer, the inside wall of the container was scraped down followed by putting the container back into the mixer for another cycle. The resin composition obtained was used immediately to prepare an uncured, Liner-supported surfacing film.

Preparation of Uncured, Liner-Supported Surfacing Films

The heated [90° C./194° F.] composition from the "Preparation of Resin Compositions" procedure above was coated between two 0.005 inch (0.13 millimeters) thick paper Liners, each having a silicone release coating on one side and a polyethylene coating on the opposite side, such that the surfacing film contacted the silicone-coated side of each Liner. This was done using a knife-over-bed coating station having a gap setting of 0.008 inches (0.20 millimeters) greater than the combined release Liner thickness and a bed and knife temperature of 194° F. (90° C.). A Liner supported surfacing film was obtained. The Liner/surfacing film/Liner sandwich was stored for 24 hours at room temperature (about 72° F. (22° C.)), then stored at −20° F. (−29° C.) until further use.

Preparation of Laminates of Uncured Surfacing Film With Incorporated Lightning Strike Protection (Expanded Copper Foil)

A sample of a Liner/surfacing film/Liner sandwich was equilibrated at room temperature prior to use. The Liner from one side of the sandwich, measuring about 11.5 inches (29.2 centimeters) long and about 6 inches (15.2 centimeters) wide, was removed and Expanded Copper Foil was placed onto the exposed surfacing film surface. Alternately, for comparative examples, Expanded Copper Foil was placed onto an exposed surface of a comparative surfacing film. This Expanded Copper Foil was slightly larger in size than the sandwich. The Liner was replaced over the Expanded Copper Foil and this lay-up was passed between two rubber-coated, heated nip rollers at a temperature of approximately 140° F. (60° C.). The position of the upper roller and its contact pressure with the lower drive roller was controlled by air pressurized pistons having an air supply pressure of about 20 psi (137.9 kPa). A surfacing film having an Expanded Copper Foil embedded therein and having a release Liner on each side was obtained.

Preparation of Cured Polymeric Composite Articles With Surfacing Film on One Outer Surface With reference to FIG. 1, cured, woven carbon fiber reinforced polymeric composite articles 10 having surfacing film 40 on one outer surface of a composite substrate 30 were made by the following process. Three plies of carbon fiber Pre-Preg material, measuring 4 inches by 4 inches (10.16 centimeters by 10.16 centimeters), were laid up one over another and a layer of a surfacing film obtained as described in "Preparation of Uncured, Liner-supported Surfacing Films" was positioned on the upper outer major surface of the resulting construction. Alternately, for comparative examples, a layer of a comparative surfacing film was used. This lay-up was placed in a vacuum bag with surfacing film directly against the tool surface which was then positioned in an autoclave. A full vacuum of about 28 inches Hg was applied at room temperature (approximately 72° F. (22° C.)) for 10 to 15 minutes after which the external pressure was gradually increased to 55 psi (397 kPa). The vacuum bag was kept under full vacuum (28 inches of Hg) for the duration of the cure cycle, and the temperature was raised at 5° F./minute (2.8° C./minute) up to 350° F. (177° C.) and held there for 2 hours. The cured polymeric composite article 10 with surfacing film 40 on one surface was then cooled at 10° F./minute (5.5° C./minute) to room temperature, at which point the pressure was released, and the cured article having an approximate thickness of 0.045 inches (0.114 mm) was removed from the autoclave and vacuum bag.

Figure 2:
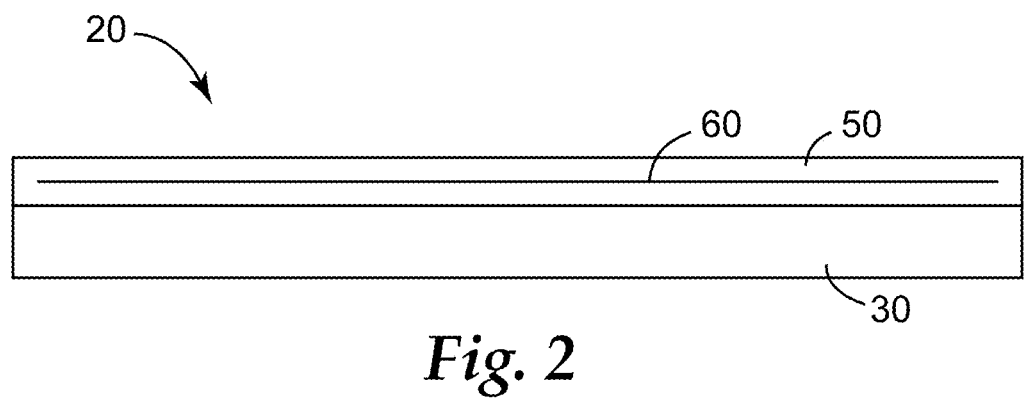
FIG. 2 is diagram of a layered construction as described in the Examples section, below.

Preparation of Cured Polymeric Composite Articles With Surfacing Film With Incorporated Expanded Copper Foil on One Outer Surface With reference to FIG. 2, cured, woven carbon fiber reinforced polymeric composite articles 20 having surfacing film 50 incorporating lightning strike protection in the form of an Expanded Copper Foil 60 on one outer surface of a composite substrate 30 were made by the following process. Three plies of carbon fiber Pre-Preg material, measuring 4 inches by 4 inches (10.16 centimeters by 10.16 centimeters), were laid up one over another and a layer of surfacing film with incorporated Expanded Copper Foil obtained as described in "Preparation of Laminates of Uncured Surfacing Film with Incorporated Lightning Strike Protection (Expanded Copper Foil)" was positioned on the upper outer major surface of the resulting construction. This lay-up was placed in a vacuum bag with surfacing film directly against the tool surface which was then positioned in an autoclave. A full vacuum of about 28 inches Hg was applied at room temperature (approximately 72° F. (22° C.)) for 10 to 15 minutes after which the external pressure was gradually increased to 55 psi (397 kPa). The vacuum bag was kept under full vacuum (28 inches of Hg) for the duration of the cure cycle, and the temperature was raised at 5° F./minute (2.8° C./minute) up to 350° F. (177° C.) and held there for 2 hours. The cured polymeric composite article (FIG. 2) with surfacing film on one surface was then cooled at 10° F./minute (5.5° C./minute) to room temperature, at which point the pressure was released, and the cured article having an approximate thickness of 0.045 inches (0.114 mm) was removed from the autoclave and vacuum bag.

Testing With Rain Erosion Simulator

The apparatus used to test for rain erosion resistance is described in detail in U.S. Pat. Pub. No. 2008/0209981 A1 "Method of Testing Liquid Drop Impact and Apparatus," the disclosure of which is incorporated herein by reference.

The testing apparatus was assembled using a 0.177 caliber air gun ("Drozd Air Gun", European American Armory Corporation, Cocoa, Fla.) and ½ inch (1.27 cm) diameter polyvinyl chloride tube as the barrel section. 4.5 mm Grade II acetate pellets (Engineering Laboratories, Inc, Oakland, N.J.) are propelled through use of the pellet gun which is connected to a tank of compressed nitrogen (Oxygen Service Company, St. Paul, Minn.) set at about 60 psi (414 kPa). Samples are continuously coated with a stream of water delivered through use of a water pump (Part No. 23609-170, VWR, West Chester, Pa.). Velocity of the pellets was measured with a CED Millennium Chronograph, available from Competitive Edge Dynamics LLC, Orefield, Pa.

The test specimens were machined on the diamond saw from larger test panels prepared as described above. The samples were tested by adhering approximately 0.5 inch by 0.5 inch (1.27 cm by 1.27 cm) specimens of Cured Polymeric Composite Articles with Surfacing Film or Cured Polymeric Composite Articles with Surfacing Film with Incorporated Expanded Copper Foil on one outer surface to a round 304 stainless steel plate having an outer diameter of 7.6 cm and a central hole with a diameter of 0.35 cm. Test specimens were positioned un-surfaced composite surface down to the stainless steel substrate. 3M™ Scotch-Weld™ 2158 B/A two part adhesive kit was used to adhere samples to the stainless steel substrate. The adhesive used to adhere samples to the substrates was allowed to cure on for 24 hours at 75° F. (24° C.) before testing. The tests were conducted at a shot rate of 10 shots/sec. The test results are shown in Tables 2 and 3.

TABLE 2

Simulated Rain Erosion Test Results for Composite Surfacing Panels without incorporated Expanded Copper Foil

|  | CEx-5 (FM® 300-2K) no Cu | CEx-2 (AF-555) no Cu | CEx-1 (AF-325) no Cu | CEx-3 (AF-191) no Cu | Ex-1 (SF-1) no Cu | Ex-2 (SF-2) no Cu | Ex-4 (SF-4) no Cu |
| --- | --- | --- | --- | --- | --- | --- | --- |
| Total # of shots | 323 | 437 | 30 | 383 | 366 | 394 | 690 |
| Average velocity [ft/s] | 456 | 453 | 459 | 459 | 461 | 453 | 455 |
|  | Crack detected at 323 | No Crack at 437 | Crack detected at 30 | No crack detected at 383 | No Crack detected at 366 | No Crack detected at 394 | No Crack detected at 690 |

TABLE 3

Simulated Rain Erosion Test Results for Composite Surfacing Panels with incorporated Expanded Copper Foil.

|  | CEx-5 (FM® 300-2K) with Cu | CEx-2 (AF-555 with Cu | CEx-1 (AF-325) with Cu | CEx-3 (AF-191) with Cu | Ex-1 (SF-1) with Cu | Ex-2 (SF-2) with Cu | Ex-4 (SF-4) with Cu |
| --- | --- | --- | --- | --- | --- | --- | --- |
| Total # of shots | 353 | 63 | 56 | 391 | 180 | 436 | 341 |
| Average velocity [ft/s] | 450 | 463 | 453 | 458 | 458 | 453 | 451 |
|  | Crack detected at 150. Copper exposed at 353 | Copper exposed at 63 | Copper exposed at 30 | Crack detected at 180. Copper exposed at 391 | Crack detected at 180 | Crack detected at 436 | No crack detected at 341 |

Samples examination for crack detection was performed using Bausch and Lomb variable (7× to 30×) magnification optical microscope with external light source. The surfacing films according to the present disclosure were shown to be more durable than the comparative surfacing solutions, as evidenced by a higher "Number of Shots before Crack is Detected."

Figure 3:
FIG. 3 is a micrograph of a prior art layered construction as described in the Examples section, below.
Figure 4:
FIG. 4 is a micrograph of a prior art layered construction as described in the Examples section, below.
Figure 5:
FIG. 5 is a micrograph of a prior art layered construction as described in the Examples section, below.
Figure 6:
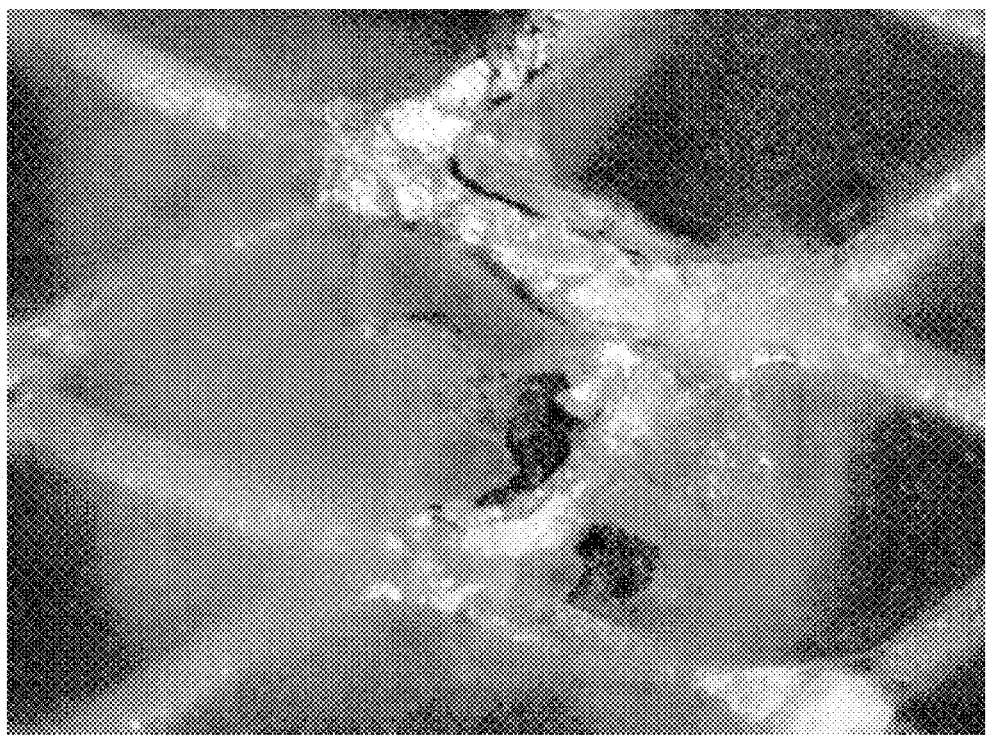
FIG. 6 is a micrograph of a prior art layered construction as described in the Examples section, below.
Figure 7:
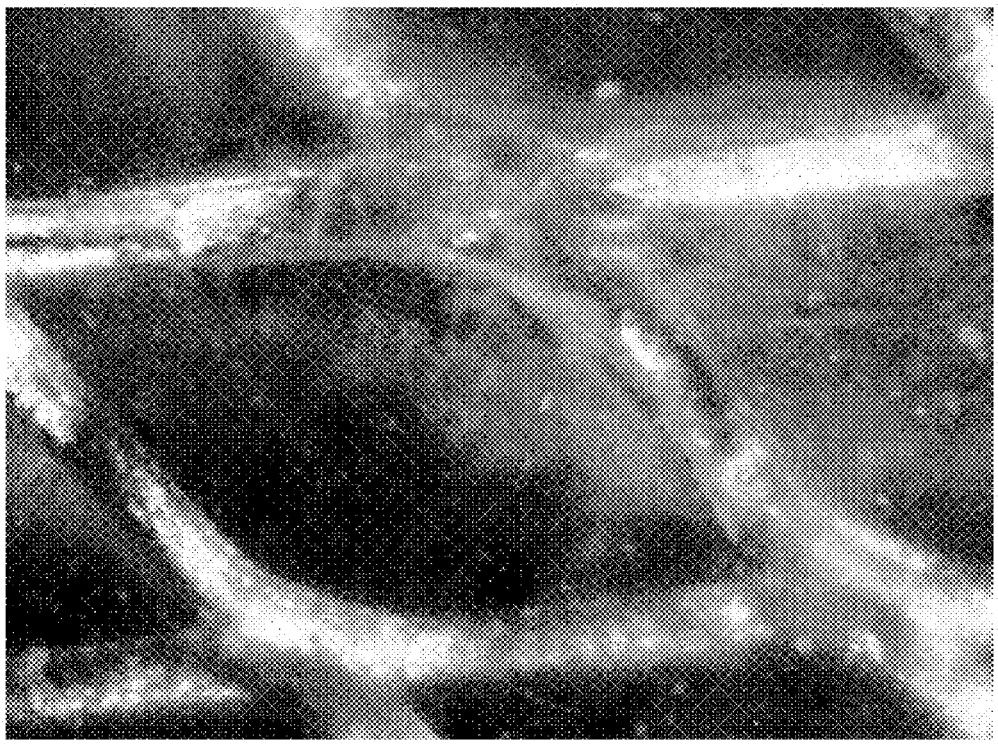
FIG. 7 is a micrograph of a layered construction according to the present disclosure, as described in the Examples section, below.
Figure 8:
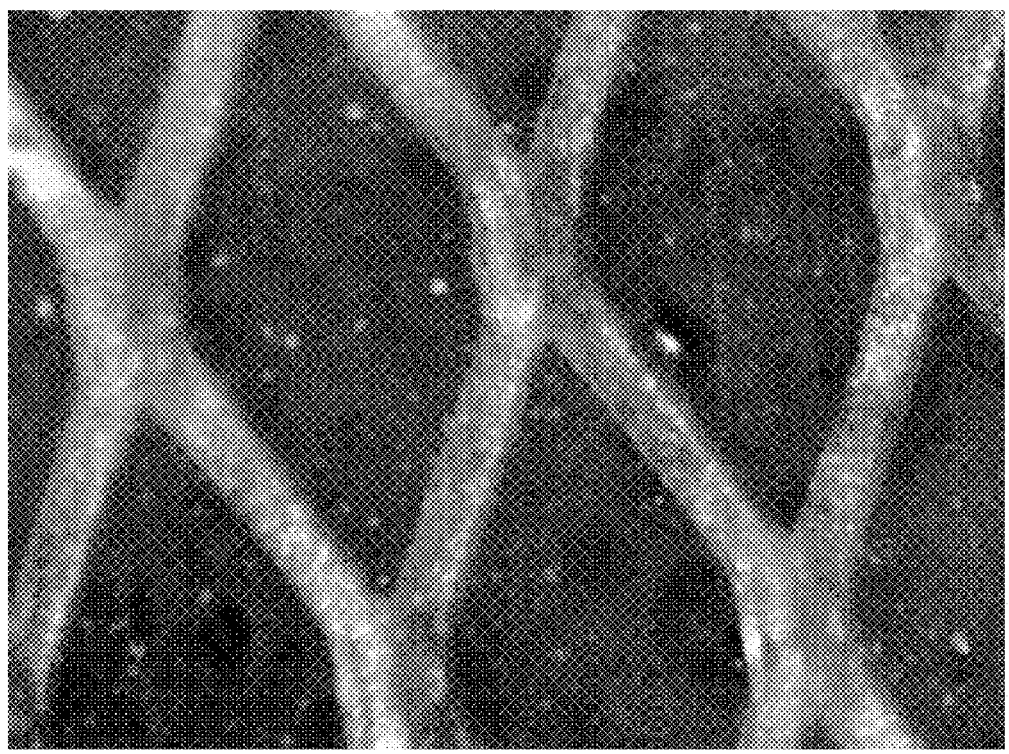
FIG. 8 is a micrograph of a layered construction according to the present disclosure, as described in the Examples section, below.

FIG. 3 is a micrograph of a test sample of CEx-5 (FM® 300-2K) with Copper, after testing on the rain erosion simulator. FIG. 4 is a micrograph of a test sample of CEx-3 (AF-191) with Copper after testing on the rain erosion simulator. FIG. 5 is a micrograph of a test sample of CEx-1 (AF-325) with Copper after testing on the rain erosion simulator. FIG. 6 is a micrograph of a test sample of CEx-2 (AF-555) with Copper after testing on the rain erosion simulator. FIG. 7 is a micrograph of a test sample of Ex-1 (SF-1) with Copper after testing on the rain erosion simulator. FIG. 8 is a micrograph of a test sample of Ex-4 (SF-4) with Copper after testing on the rain erosion simulator.

Testing by Static Thermal Shock Exposure

Test specimens with approximate dimensions of 5.0 inch (12.7 cm) by 1.5 inch (3.8 cm) by 0.045 inch (0.114 cm) were machined on the diamond saw from larger test panels prepared as described above.

Five test specimens representing each example or comparative example prepared as described above with incorporation of Expanded Copper Foil were conditioned at 75° F./ambient humidity for seven days before being placed into the dual chamber thermal shock oven where one chamber is capable of maintaining −67° F. (−54° C.) and another chamber is capable of maintaining 180° F. (80° C.). Equilibration time at each temperature was 10 minutes. 1000 hours of exposure time is achieved in approximately seven days.

At the 1000 and 2000 hour marks one sample representing each example or comparative example was removed from thermal shock chamber and examined for microcracks. The remaining samples were allowed to continue testing.

Samples examination for crack detection was performed using the same microscope used for cracks detection of samples for rain erosion simulation.

TABLE 4

Static thermal shock results

|  | 1000 h | 2000 h |
| --- | --- | --- |
| CEx-1 (AF-325) | no cracks | multiple cracks |
| CEx-2 (AF-555) | no cracks | multiple cracks |
| CEx-3 (AF-191) | no cracks | multiple cracks |
| CEx-4 (SYNSKIN® HC 9837.1) | no cracks | few cracks |
| CEx-5 (FM® 300-2K) | multiple cracks | multiple cracks |
| Ex-1 (SF-1) | no cracks | few cracks |
| Ex-2 (SF-2) | no cracks | no cracks |
| Ex-3 (SF-3) | no cracks | no cracks |
| Ex-4 (SF-4) | no cracks | no cracks |

Rheometric Dynamic Analyzer (RDA), Torsion Mode

Test specimens with approximate dimensions of 1.5 inch (3.8 cm) by ¼ inch (0.635 cm) by 0.045 inch (0.114 cm) were machined on the diamond saw from larger test panels prepared as described above with incorporation of Expanded Copper Foil. In addition, a test specimen of similar dimensions was prepared from only three plies of cured woven carbon fiber reinforced composite without any surfacing film on the outer surface. The samples were tested by utilizing Rheometric Dynamic Analyzer using torsion method with a 1 Hz or 10 Hz frequency and 0.2% or 1.0% applied strain and at isothermal conditions at 75° F. (24° C.) or −67° F. (−54° C.). Testing at 10 Hz, 1.0% strain, 75° F. (24° C.) and −67° F. (−54° C.) was conducted for the duration of two (2) hours. Testing at 1 Hz, 0.2% strain, −67° F. (−54° C.) was conducted for the duration of twenty four (24) hours.

TABLE 5

Torsion RDA test results.

|  | 1 Hz<br>0.2% strain<br>24 h@−54° C. | 10 Hz<br>1% strain<br>2 h@24° C. | 10 Hz<br>1% strain<br>2 h@−54° C. |
|---|---|---|---|
| CEx-1 (AF-325) | multiple cracks | 2 cracks | multiple cracks |
| CEx-2 (AF-555) | no cracks | no cracks | 4 crack |
| CEx-3 (AF-191) | no cracks | no cracks | 1 crack |
| CEx-4 (SYNSKIN ® HC 9837.1) | no cracks | 5 cracks | multiple cracks |
| CEx-5 (FM ® 300-2K) | multiple cracks | multiple cracks | multiple cracks |
| Ex-1 (SF-1) | no cracks | no cracks | no cracks |
| Ex-4 (SF-4) | no cracks | no cracks | no cracks |
| Ex-5 (SF-5) | no cracks | no cracks | no cracks |

Samples examination for crack detection after testing on RDA in torsion mode was performed using Bausch and Lomb variable (7× to 30×) magnification optical microscope with external light source.

As evident from the data in the Table 5, microcracking resistance of the surfacing films according to the present disclosure was superior to the comparative examples.

Table 6 reports elastic (storage) modulus (G') data for samples representing the examples and comparative examples. In the RDA test methodology G' is defined as the elastic (storage) modulus=cos δ (τ/γ) where δ is a phase angle (phase shift between stress and strain vectors), τ is stress and γ is strain.

The ability of the cured composite articles with surfacing film according to the present disclosure incorporating Expanded Copper Foil on one outer surface to resist microcracking is related to elastic (storage) modulus (G') of the surfacing film (in particular, as tested by conventional methods, typically Rheometric Dynamic Analyzer, torsion mode, as described above.) Improved microcracking resistance was found for the surfacing films according to the present disclosure, especially where the ratio of storage modulus $G'_s$ for the three plies of composite substrate without surfacing film to storage modulus $G'_s+G'_{sr}$ for the three plies of composite substrate with surfacing film with incorporated lightning strike protection had a value of 0.85 or more; i.e., microcracking resistance coefficient [C] was ≥0.85.

$$C=G'_s/(G'_s+G'_{sr})\geq 0.85$$

This selection may also be stated as follows: the storage modulus for the composite with surfacing film measured at 25° C. $[G'_{t25}]$ is no more than 118% of the storage modulus for the composite without surfacing film measured at 25° C. $[G'_{s25}]$, more typically no more than 115%, more typically no more than 112%, in some embodiments no more than 110%, in some embodiments no more than 108%, in some embodiments no more than 106%, and in some embodiments no more than 104%. This selection may also be stated as follows: the storage modulus for the composite with surfacing film measured at −54° C. $[G'_{t-54}]$ is no more than 118% of the storage modulus for the composite without surfacing film measured at −54° C. $[G'_{s-54}]$, more typically no more than 115%, more typically no more than 112%, in some embodiments no more than 110%, in some embodiments no more than 108%, in some embodiments no more than 106%, and in some embodiments no more than 104%.

Various modifications and alterations of this invention will become apparent to those skilled in the art without departing from the scope and principles of this invention, and it should be understood that this invention is not to be unduly limited to the illustrative embodiments set forth hereinabove.

TABLE 6

Elastic (Storage) Modulus (G') Data for Bare Cured Composite Substrate and Cured Polymeric Composite Articles with Surfacing Film Incorporating Expanded Copper Foil

|  | Storage Modulus, Bare Substrate $[G'_s]$ @25° C. [Pa] | Storage Modulus, Substrate with Surfacing Film $[G'_s + G'_{sr}]$ @25° C. [Pa] | Storage Modulus, Bare Substrate $[G'_s]$ @−54° C. [Pa] | Storage Modulus, Substrate with Surfacing Film $[G'_s + G'_{sr}]$ @−54° C. [Pa] | $G'_s/$ $G'_s + G'_{sr}$ @25° C. | $G'_s/$ $G'_s + G'_{sr}$ @−54° C. | $(G'_s + G'_{sr})/$ $G'_s$ @25° C. | $(G'_s + G'_{sr})/$ $G'_s$ @−54° C. |
|---|---|---|---|---|---|---|---|---|
| CEx-1 (AF-325) | 2.7E+09 | 3.4E+09 | 3.0E+09 | 4.0E+09 | 0.79 | 0.75 | 125% | 133% |
| CEx-2 (AF-555) | 2.7E+09 | 3.5E+09 | 3.0E+09 | 3.9E+09 | 0.77 | 0.77 | 129% | 130% |
| CEx-3 (AF-191) | 2.7E+09 | 3.3E+09 | 3.0E+09 | 3.7E+09 | 0.83 | 0.81 | 122% | 123% |
| CEx-4 (SYNSKIN ® HC 9837.1) | 2.7E+09 | 3.2E+09 | 3.0E+09 | 3.8E+09 | 0.84 | 0.79 | 118% | 126% |
| CEx-5 (FM ® 300-2K) | 2.7E+09 | 3.7E+09 | 3.0E+09 | 4.2E+09 | 0.73 | 0.71 | 137% | 140% |
| Ex-1 (SF-1) | 2.7E+09 | 3.1E+09 | 3.0E+09 | 3.4E+09 | 0.87 | 0.88 | 114% | 113% |
| Ex-2 (SF-2) | 2.7E+09 | 3.0E+09 | 3.0E+09 | 3.3E+09 | 0.90 | 0.91 | 111% | 110% |
| Ex-3 (SF-3) | 2.7E+09 | 2.9E+09 | 3.0E+09 | 3.2E+09 | 0.93 | 0.94 | 107% | 106% |
| Ex-4 (SF-4) | 2.7E+09 | 2.8E+09 | 3.0E+09 | 3.1E+09 | 0.96 | 0.97 | 103% | 103% |
| Ex-5 (SF-5) | 2.7E+09 | 3.0E+09 | 3.0E+09 | 3.3E+09 | 0.92 | 0.92 | 111% | 110% |

I claim:

1. A layered construction comprising:
   a) a cured polymeric composite comprising a reinforcement component selected from the group consisting of metal, wood, polymer, carbon particles, carbon fibers, glass particles, glass fibers, and combinations thereof and a matrix component selected from the group consisting of polyester, vinyl ester, epoxy, phenolic, polyimide, polyamide, polypropylene, PEEK, and combinations thereof; and
   b) a cured surfacing film bound thereto;
   wherein the cured polymeric composite has a storage modulus $G'_{s25}$ at 25° C., and wherein the layered construction has an overall storage modulus $G'_{t25}$ at 25° C. that is no more than 118% of $G'_{s25}$, each of $G'_{s25}$ and $G'_{t25}$ measured on a rheometric dynamic analyzer operating in torsion mode at a frequency of 1 Hz and an applied strain of 0.2%, and wherein the cured polymeric composite comprises a matrix polymer which is a different composition from the cured surfacing film.

2. The layered construction according to claim 1 wherein $G'_{t25}$ is no more than 110% of $G'_{s25}$.

3. The layered construction according to claim 1 wherein $G'_{t25}$ is no more than 104% of $G'_{s25}$.

4. The layered construction according to claim 1 wherein $G'_{t25}$ is between 101% and 118% of $G'_{s25}$.

5. The layered construction according to claim 1 having a storage modulus $G'_{t-54}$ at −54° C., wherein the cured polymeric composite has a storage modulus $G'_{s-54}$ at −54° C.; and wherein $G'_{t-54}$ is no more than 122% of $G'_{s-54}$.

6. The layered construction according to claim 5 wherein $G'_{t-54}$ is between 101% and 122% of $G'_{s-54}$.

7. The layered construction according to claim 1 wherein the cured surfacing film comprises an electrically conductive layer.

8. The layered construction according to claim 1 wherein the cured surfacing film comprises an electrically conductive metal layer.

9. The layered construction according to claim 1 wherein the cured surfacing film comprises a cured chain-extended epoxy resin.

10. The layered construction according to claim 1 wherein the cured surfacing film comprises no phosphorus.

11. A method of making a layered construction comprising the steps of:
    a) providing a curable polymeric composite comprising a reinforcement component selected from the group consisting of metal, wood, polymer, carbon particles, carbon fibers, glass particles, glass fibers, and combinations thereof and a matrix component selected from the group consisting of polyester, vinyl ester, epoxy, phenolic, polyimide, polyamide, polypropylene, PEEK, and combinations thereof, curable to form a cured polymeric composite having a storage modulus $G'_{s25}$ at 25° C.;
    b) selecting a curable surfacing film;
    c) providing said curable surfacing film;
    d) providing a tool having a shape which is the inverse of the desired shape of the layered construction;
    e) laying up the curable surfacing film and the curable polymeric composite, in that order, in the tool; and
    f) curing the curable polymeric composite and curable surfacing film to make a layered construction, the layered construction having a storage modulus $G'_{t25}$ at 25° C.;
    wherein step b) of selecting a curable surfacing film comprises selecting a film such that $G'_{t25}$ is not more than 118% of $G'_{s25}$, each of $G'_{s25}$ and $G'_{t25}$ measured on a rheometric dynamic analyzer operating in torsion mode at a frequency of 1 Hz and an applied strain of 0.2%, and wherein the cured polymeric composite comprises a matrix polymer which is a different composition from the cured surfacing film.

12. The method according to claim 11 wherein step b) of selecting a curable surfacing film comprises selecting a film such that $G'_{t25}$ is no more than 110% of $G'_{s25}$.

13. The method according to claim 11 wherein step b) of selecting a curable surfacing film comprises selecting a film such that $G'_{t25}$ is no more than 104% of $G'_{s25}$.

14. The method according to claim 11 wherein step b) of selecting a curable surfacing film comprises selecting a film such that $G'_{t25}$ is between 101% and 118% of $G'_{s25}$.

15. The method according to claim 11 wherein the curable surfacing film comprises an electrically conductive layer.

16. The method according to claim 11 wherein the curable surfacing film comprises an electrically conductive metal layer.

17. The method according to claim 11 wherein the curable surfacing film comprises a cured chain-extended epoxy resin.

18. The method according to claim 11 wherein the curable surfacing film comprises no phosphorus.

19. A method of making a layered construction comprising the steps of:
    a) providing a curable polymeric composite comprising a reinforcement component selected from the group consisting of metal, wood, polymer, carbon particles, carbon fibers, glass particles, glass fibers, and combinations thereof and a matrix component selected from the group consisting of polyester, vinyl ester, epoxy, phenolic, polyimide, polyamide, polypropylene, PEEK, and combinations thereof, curable to form a cured polymeric composite having a storage modulus $G'_{s25}$ at 25° C.;
    b) selecting a curable surfacing film;
    c) providing said curable surfacing film;
    d) providing a tool having a shape which is the inverse of the desired shape of the layered construction;
    e) laying up the curable surfacing film and the curable polymeric composite, in that order, in the tool; and
    f) curing the curable polymeric composite and curable surfacing film to make a layered construction, the layered construction having a storage modulus $G'_{t25}$ at 25° C.;
    wherein step b) of selecting a curable surfacing film comprises selecting a film such that $G'_{t25}$ is between 101% and 118% of $G'_{s25}$, each of $G'_{s25}$ and $G'_{t25}$ measured on a rheometric dynamic analyzer operating in torsion mode at a frequency of 1 Hz and an applied strain of 0.2%, and wherein the cured polymeric composite comprises a matrix polymer which is a different composition from the cured surfacing film.

* * * * *

UNITED STATES PATENT AND TRADEMARK OFFICE
CERTIFICATE OF CORRECTION

PATENT NO. : 10,442,550 B2  
APPLICATION NO. : 15/482898  
DATED : October 15, 2019  
INVENTOR(S) : Dmitriy Salnikov Page 1 of 1

It is certified that error appears in the above-identified patent and that said Letters Patent is hereby corrected as shown below:

In the Specification

Column 4
Line 62, delete "Cex." and insert -- CEx. --, therefor.

Column 5
Line 14, delete "HYPDX™" and insert -- HYPOX™ --, therefor.
Line 17, delete "HYPDX™" and insert -- HYPOX™ --, therefor.

Signed and Sealed this
Third Day of December, 2019

Andrei Iancu
*Director of the United States Patent and Trademark Office*